United States Patent
Seshadri

(10) Patent No.: US 7,114,021 B2
(45) Date of Patent: Sep. 26, 2006

(54) SYSTEM AND METHOD PROVIDING CONFIGURATION SERVICES FOR COMMUNICATIONS DEVICES

(75) Inventor: Krishna Seshadri, The Woodlands, TX (US)

(73) Assignee: Symbol Technologies, Inc., Holtsville, NY (US)

( * ) Notice: Subject to any disclaimer, the term of this patent is extended or adjusted under 35 U.S.C. 154(b) by 182 days.

(21) Appl. No.: 10/056,173

(22) Filed: Jan. 24, 2002

(65) Prior Publication Data

US 2004/0267971 A1 Dec. 30, 2004

Related U.S. Application Data

(60) Provisional application No. 60/272,685, filed on Mar. 1, 2001.

(51) Int. Cl.
*G06F 13/00* (2006.01)
*G06F 15/177* (2006.01)

(52) U.S. Cl. .............. 710/104; 713/1; 713/150

(58) Field of Classification Search ......... 710/300, 710/8, 305; 713/155, 1; 709/203, 217, 220; 380/277; 379/211.02; 455/552.1; 345/762; 715/762, 826
See application file for complete search history.

(56) References Cited

U.S. PATENT DOCUMENTS

| | | | | |
|---|---|---|---|---|
| 5,550,907 A | * | 8/1996 | Carlsen | 379/211.02 |
| 5,579,529 A | * | 11/1996 | Terrell et al. | 710/8 |
| 5,774,551 A | * | 6/1998 | Wu et al. | 713/155 |
| 5,784,555 A | * | 7/1998 | Stone | 709/220 |
| 5,987,498 A | * | 11/1999 | Athing et al. | 709/203 |
| 6,198,941 B1 | * | 3/2001 | Aho et al. | 455/552.1 |
| 6,233,341 B1 | * | 5/2001 | Riggins | 380/277 |
| 6,275,225 B1 | | 8/2001 | Rangarajan et al. | |
| 6,278,449 B1 | * | 8/2001 | Sugiarto et al. | 715/826 |
| 6,449,715 B1 | * | 9/2002 | Krivoshein | 713/1 |
| 6,509,913 B1 | * | 1/2003 | Martin et al. | 715/762 |
| 6,654,797 B1 | * | 11/2003 | Kamper | 709/220 |
| 6,687,817 B1 | * | 2/2004 | Paul | 713/1 |
| 6,697,852 B1 | * | 2/2004 | Ryu | 709/220 |
| 6,928,505 B1 | * | 8/2005 | Klingman | 710/305 |
| 2001/0034771 A1 | * | 10/2001 | Hutsch et al. | 709/217 |
| 2002/0122061 A1 | * | 9/2002 | Martin et al. | 345/762 |

FOREIGN PATENT DOCUMENTS

WO WO 01/07981 A2 * 2/2001

* cited by examiner

*Primary Examiner*—Khanh Dang
*Assistant Examiner*—Christopher E. Lee
(74) *Attorney, Agent, or Firm*—Amin & Turocy, LLP

(57) ABSTRACT

A communications system and method is provided for enabling remote user configuration of a communications device. The system includes at least one communications device configurable for a plurality of users and at least one remote computer for storing configuration information associated with the plurality of users. A configuration request message is generated by the communications device to initiate a configuration of the communications device and a configuration response message is generated by the remote computer to enable configuration of the communications device, wherein the configuration response message includes configuration information associated with at least one of the plurality of users.

31 Claims, 6 Drawing Sheets

SYSTEM AND METHOD PROVIDING CONFIGURATION SERVICES FOR COMMUNICATIONS DEVICES

CROSS REFERENCE TO RELATED APPLICATION

This application claims the benefit of U.S. Provisional Patent Application Ser. No. 60/272,685, which was filed Mar. 1, 2001, entitled SYSTEM AND METHOD PROVIDING CONFIGURATION SERVICES FOR COMMUNICATIONS DEVICES.

TECHNICAL FIELD

The present invention relates generally to computer and communication systems, and more particularly to a system and method for providing user specific configuration of a handheld computer and/or other communications device and improves the functionality and productivity associated therewith.

BACKGROUND OF THE INVENTION

In recent years, society has witnessed a rapid expansion in the acceptance of handheld communications devices. This has been made possible by continual advancements in microelectronics and power technologies, which have aided in decreasing the size, weight and cost of these devices while increasing functionality. Such devices are employed in organizing day to day schedules, keeping track of appointments, inventory control, digital storage of personal notes, communication such as e-mail, telephony communications (e.g., cell phones) and in many other applications. These systems are generally configured with specific applications and information required by a single user, and generally are not currently optimized for one or more additional users. Similarly, a single user cannot easily re-configure these devices in a different mode or environment. Attributes relating to the types of applications used, preferred display formats, and personalized information such as an e-mail address, phone number, address book and phone book are not easily changed in order to accommodate different users or different requirements, for example. Hence, these systems are highly personalized and specific in nature. Thus, device operation by an individual other than the original intended user or in a manner other than that which was originally conceived is cumbersome and sometimes difficult.

There are, however, many instances wherein device operation in multiple environments or modes and by multiple individuals is desirable. The user of a single communications device often desires to utilize the device for both a personal and professional environment. This may require different applications or different levels of access, different personal addresses and phone numbers, and different address books and phone books, for example. Also, it may be desirable to have multiple users operating a single device. For example, multiple users may utilize the same device in the performance of duties during separate shifts in a business. Multiple user environments may require different applications or different levels of access for various users, for example. The accomplishment of the above generally requires a great deal of time in manual reconfiguration of a given device for the current user and/or current environment.

In view of the above, there is a need for a system and/or methodology to facilitate rapid and flexible reconfiguration of devices without sacrificing system cost or functionality associated therewith.

SUMMARY THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology providing rapid and flexible configuration of a communications system for an individual user in a multiple user environment and/or in a specific application/mode in a single and/or multiple user environment. The present invention provides for updating/customizing user and application specific configuration information as requested by a handheld computer (e.g., Personal Digital Assistant (PDA), palm pilot, laptop) and/or other communications device, hereinafter collectively referred to as the communications device or devices, from a remote computer system. The configuration information may include user authentication, application enabling and user specific presentation, computation data, and user specific information for the current operating environment and communications settings. As an example, a phone number, email address, phone book and address book may be transmitted according to a login sequence associated with the communications device in accordance with authentication of the user by the remote computer.

In accordance with the present invention, the user of the communications device is provided with a system to enter information wherein an individual user may be identified (e.g., login name, user id, and password including all or any subset of these) and authenticated. This information is then transmitted to the remote computer for authentication and retrieval of user-specific information. The user-specific information is stored on the remote computer in a database, for example. The remote computer searches for a record that matches the user identification information transmitted by the communications device. Upon finding a matching record, the user is authenticated and the user-specific application and communication information stored within a file associated with the record is transmitted to the communication device. The communication device is thus configured by information received from the remote computer without further communications with the remote computer. Upon completion of a session by an individual user, a logout sequence is initiated. This sequence reestablishes communications with the remote computer, authenticates the current user, and transmits any changes to the user-specific configuration information to the remote computer. The remote computer locates the matching user record within its database and updates the desired changes to the user information within the associated file. It is noted that other sessions and/or logins may be initiated on the handheld device by the same or another user.

In accordance with one aspect of the present invention, a communications system is provided to enable remote user configuration of a communications device. The system includes at least one communications device configurable for a plurality of users and a configuration request message generated by the communications device to initiate a configuration of the communications device. A configuration response message is received by the communications device to enable configuration of the communications device, wherein the configuration response message includes configuration information associated with at least one of the plurality of users.

According to another aspect of the present invention, a method is provided for a configurable user interface. The method includes: generating a configuration request message; generating a configuration response message including configuration information for a communications device based upon the configuration request message; and configuring the communications device with the configuration information in the configuration response message.

In accordance with another aspect of the present invention, a system is provided for a configurable user interface. The system includes means for generating a configuration request message; means for generating configuration information for a communications device; and means for configuring the communications device with the configuration information in the configuration response message.

According to yet another aspect of the present invention, a communications system is provided for enabling remote user configuration. The system includes at least one remote computer for storing configurations associated with a plurality of users. A configuration request message is processed by the remote computer to determine configurations associated with the plurality of users and a configuration response message is generated by the remote computer, wherein the configuration response message includes configuration information associated with at least one of the plurality of users.

According to another aspect of the present invention, a communications system is provided for enabling remote user configuration. The system includes at least one communications device configurable for a plurality of users and at least one remote computer for storing configuration information associated with the plurality of users. A configuration request message is generated by the communications device to initiate a configuration of the communications device and a configuration response message is generated by the remote computer to enable configuration of the communications device, wherein the configuration response message includes configuration information associated with at least one of the plurality of users.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings

DETAILED DESCRIPTION OF THE INVENTION

The present invention relates to a system and methodology for efficiently and rapidly configuring a communications device, such as a hand held computer, for operation by a specific user in a multi-user environment and/or for a specific application/mode in a single and/or multi-user environment. The present invention enables the communication device to request user information from a remote computer, which contains configuration information for multiple users and/or applications in a database. Files within the database are associated with a plurality of users and/or application environments wherein configuration information is retrieved and transmitted to the communications device. The configuration information may include user authentication, application enabling and user presentation/computation data, and user information for the current operating environment.

Figure 1:
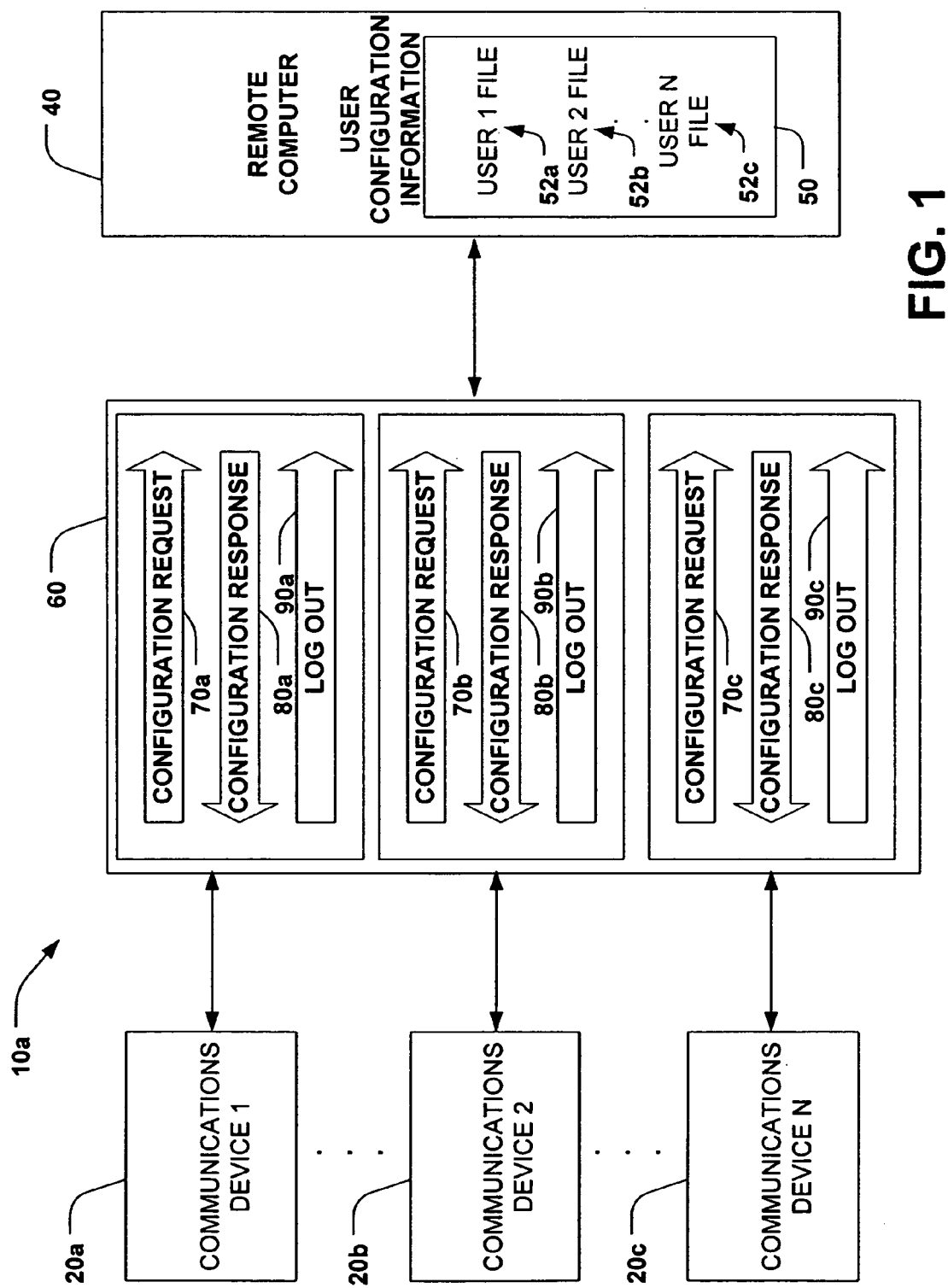
FIG. 1 is a schematic block diagram illustrating a user services and remote configuration system in accordance with an aspect of the present invention.

Referring initially to FIG. 1, a system 10a illustrates an aspect of remote user services and configuration in accordance with the present invention. A plurality of communications devices 20a through 20c (e.g., Personal Digital Assistant (PDA), palm pilot, cell phone, pager, laptop) may be employed by multiple users wherein the users may require different and/or varied device configurations. Moreover, a single user may require multiple configurations relating to one or more applications being executed by the communications devices 20a–20c. It is to be appreciated that although three devices 20a–20c are depicted for illustrative purposes; that N such devices, N being an integer, may be configured in accordance with the present invention. The communications devices 20a–20c communicate to a remote computer 40 via a transmission system 60 in order to enable remote configuration of the devices. The transmission system 60 may be substantially any well-known communications technology, including but not limited to coax, multi-conductor cable, radio frequency, infrared, fiber optics, microwave, digital/analog cellular, analog/digital satellite and/or other network or wireless technologies.

The communications devices 20a–20c transmit a configuration request message 70a–70c to the remote computer 40 in order to request configuration information. The remote computer 40 processes the configuration request messages 70a–70c, and retrieves user configuration information stored within a database 50. For example, a first user operating the communications device 20a is associated with a user configuration file 52a within the database 50 whereas a second user operating the communications device 20b is associated with a user configuration file 52b. It is noted that if the second user were to operate the communications device 20a for example, the second user may further retrieve user configuration files (not shown) associated with the second user and the communications device 20a. The user configuration information is transmitted to communications devices 20a–20c in configuration response messages 80a–80c, wherein the communications devices 20a–20c utilize the user configuration information to uniquely configure each device. It is to be appreciated that users may initiate multiple configurations. For example, a user of the communications device 20a may initiate a first configuration for a personal operating environment, and a second configuration for a business operating environment. Similarly, the same user may desire other configurations based upon the application being executed by the communications device 20a.

After configurations have occurred, or after the user desires to end communications with the remote computer 40, a logout message 90a–90c may be sent to the remote computer 40. As will be described in more detail below, the logout messages 90a–90c may include changes in user information and configuration initiated by the user and enables the remote computer 40 to update the database 50. Thus, the database 50 may be updated to reflect user-initiated changes to the communications devices 20a–20c that have occurred subsequent to previous remote configurations. It is noted that the files 52a–52c may include predetermined and/or default configuration information before communications have initially been established with the user. The user may be given the option to accept the default configuration or to manually configure the communications device 20a–20c. If a manual configuration is desired, the user may then update these selections via the logout messages 90a–90c. Additionally, a systems administrator may update the files 52a–52c and/or add/subtract files associated with more or less users at the remote computer 40 via substantially any database processing program (e.g., Word, Word Perfect, Excel).

Figure 2:
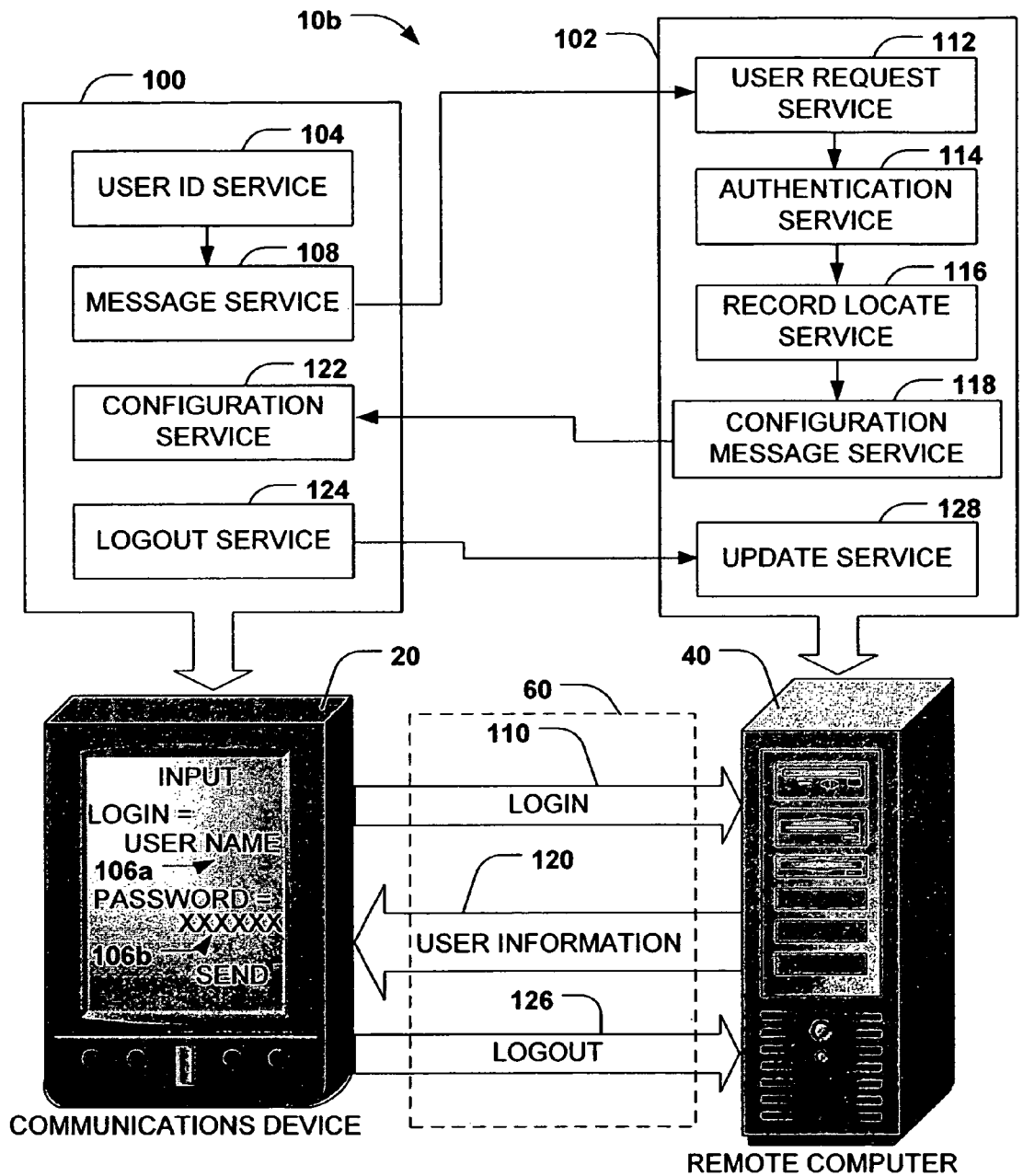
FIG. 2 is a schematic block diagram illustrating communications device and remote computer services in accordance with an aspect of the present invention.

Turning now to FIG. 2, a system 10b illustrates configuration processing and services associated with the communications device 20 and remote computer 40 in accordance with present invention. The system 10b includes communications device services 100 and remote computer services 102 for enabling remote configuration of the communications device 20. The communications device services 100 includes a user identification service or login service 104 for identifying individual users. Users may input information such as a user name 106a and/or password 106b to enable user identification and authorization at the remote computer 40. Input may be achieved through various techniques that are well known in the art, including but not limited to keyboards, keypads, touch screens, voice recognition and other systems. The communications device 20 processes the information from the login service 104 through a message service 108 wherein a login message 110 is created that includes the, user name 106a and password 106b for transmission to the remote computer 40 via the transmission system 60.

The remote computer 40 executes a user request service 112 that receives and processes the login message 110 from the communications device 40. Users are identified and authenticated via the information sent in the login message 110 through an authentication service 114. For example, a list of names and associated passwords may be compared with the user identification information within the login message 110. If a corresponding match is found, then the user may be authenticated. Otherwise an error message indicating failure to authenticate many be sent to the communications device 20. After authentication, user configuration information is located within the remote computer 40 through a record locate service 116. The record locate service searches the database 50 on the computer for configuration files associated with the user and the communications device 20. If a configuration file is found relating to the user, a configuration message service 118 creates a user information message 120 and transmits the user configuration information within the file from the remote computer 40 to the communications device 20.

A configuration service 122 receives the user information message 120 from the remote computer 40 and configures the communication device 20 in accordance with the information contained therein. For example, settings relating to audio and display portions of the communications device 20 may be configured according to a particular user's preference. These preferences may include display colors, brightness, icons, desktop organization, and other settings. Also, application information may be received as will be described in more detail below. This information may include phone numbers and e-mail addresses associated with a particular user for example. The communications device 20 provides a logout service 124 that creates a logout message 126 to inform the remote computer 40 that the current user session has ended, and also to inform of any changes in user configuration information that may have occurred since the user previously logged in. An update service 128 receives the logout message 126 from communications device 20 and updates user information in the remote computer 40 database with device and/or application changes identified within the logout message 126.

Figure 3:
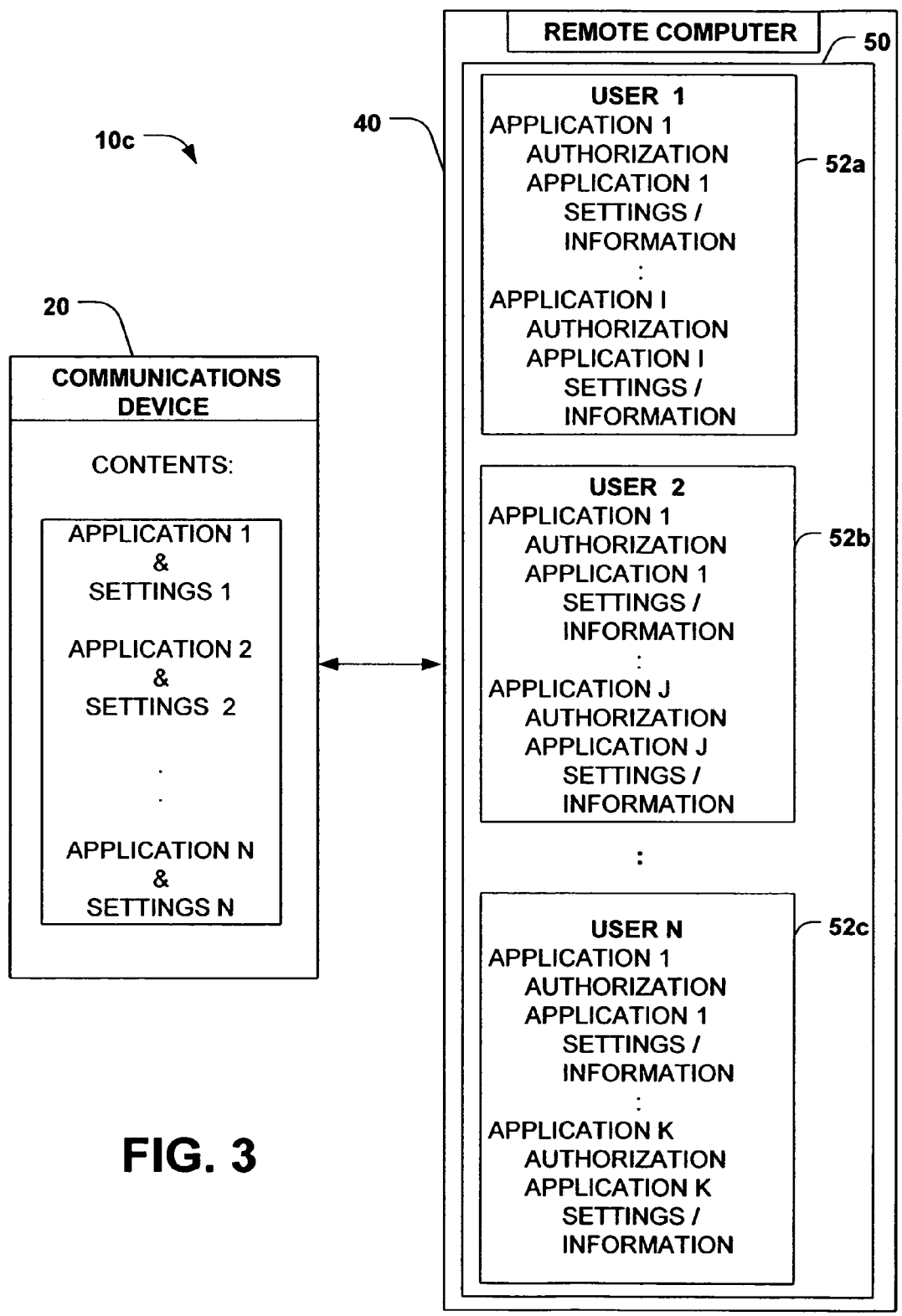
FIG. 3 is a schematic block diagram illustrating application and configuration services in accordance with an aspect of the present invention.

Referring now to FIG. 3, a system 10c illustrates application and configuration of a communications device in accordance with an aspect of the present invention. As described above in reference to FIG. 2, a message exchange is provided to update configuration information in the communications device 20 associated with a particular user. Users may have a plurality of applications and related settings (e.g., configurations associated with device, application, and user preferences), wherein the applications and settings provide a unique configuration of the communications device 20. For example, a User 1 may request from 1 to N applications and settings, N being an integer, wherein the communications device 20 is configured per application and associated setting. These applications and related settings may be retrieved from configuration files at the remote computer 40. For example, if User 1 were operating the communications device 20, configuration information is retrieved from configuration file 52a. As illustrated, configuration file 52a that is associated with User 1 may include from 1 to I applications, related settings, and authorization information, I being an integer, that is described in more detail below in relation to FIG. 4. If a second user, such as User 2 were to operate the communications device 20, configuration information is retrieved from configuration file 52b, wherein 1 to J applications, related settings, and authorization information are stored and associated with User 2. It is to be appreciated that a plurality of such configuration files may be similarly stored and retrieved at the remote computer 40. Thus, users of the communications device 20 may configure the device according to individual preferences and if desired, retrieve more than one configuration depending upon the application to be executed at the communications device 20.

Figure 4:
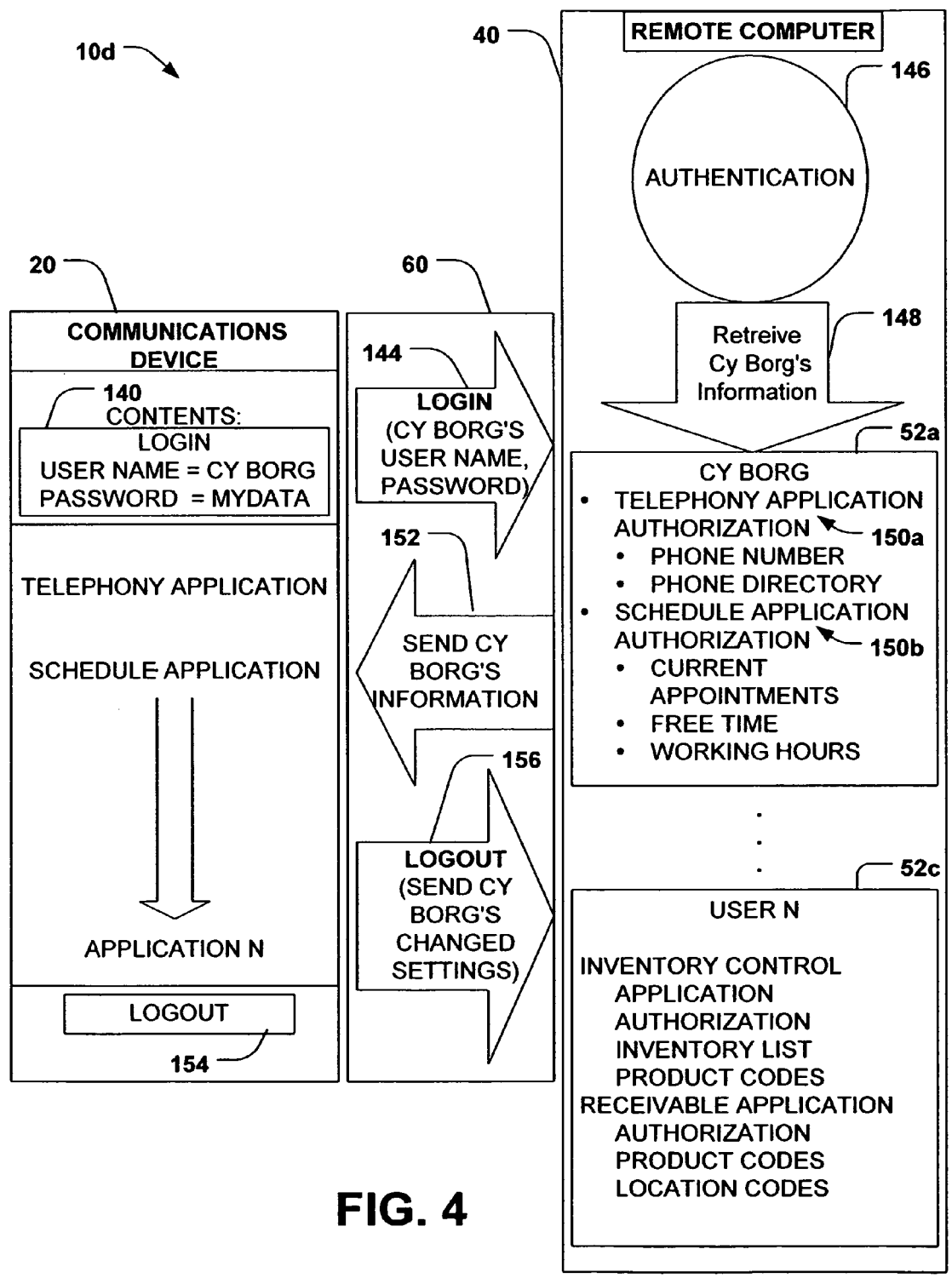
FIG. 4 is a schematic block diagram illustrating an exemplary user configuration system in accordance with an aspect of the present invention.

Turning now to FIG. 4, a system 10d illustrates an exemplary user configuration of a communications device in accordance with an aspect of the present invention. Cy Borg, a user, inputs login data 140, a user name and password in this example, into communications device 20 and initiates transmission of the login data 140 to the remote computer 40. The communications device 20 creates request message 144 and sends it via transmission system 60. The remote computer 40 performs an authentication 146 of login data 144 via a query/search 148 of the database 50 for a user record 52a matching Cy Borg's login data 160. In this example, Cy Borg's user record 52a indicates that he is authorized to access the telephony application 150a and schedule application 150b on communications device 20. Authorization may include retrieving a flag and/or a code that may be set by a systems administrator indicating whether a particular user is enabled access to an application. Cy Borg's user record 52a also contains his user configuration and information for the respective application. For example, Cy Borg's personal phone number and phone directory are stored as part of the telephony application, and his current appointments, free time and working hours are stored as part of the schedule application in his user record 52a. As shown, a configuration file 52c associated with a User N may include other applications relating to inventory and receivables. It is to be appreciated that various other applications may be realized on communications device 20, and therefore information shown in user records 52a and 52b is not limited to the specific applications and the associated information shown in this illustration.

Upon locating Cy Borg's user configuration 52a, the remote computer 40 creates a response message 152 containing Cy Borg's user configuration information and sends the message to communications device 20 via transmission system 60. The communications device 20 enables and configures the applications that correspond with the user information sent in response message 152, in this case the telephony application 150a and schedule application 150b. The communications device 20 is now configured for Cy Borg in accordance with the login data 140 and user record 52a. It is to be appreciated that Cy Borg may initiate a separate configuration and authorization for applications 150a and 150b. In other words, a user may initiate retrieval of one or more applications, then at a later time initiate a subsequent retrieval of one or more other applications. For example, a user may initiate a first configuration for business purposes for controlling and maintaining a plant floor. During the user's lunch hour, for example, a second configuration may be initiated for personal interests of the user.

When user Cy Borg has completed his tasks with the communications device 20, he initiates a logout service 154. If any changes have been made to Cy Borg's user specific application or configuration information, the communications device 20 appends and/or includes this information to logout message 156. For example, if Cy Borg has added a phone number to his phone directory, and scheduled more appointments, this information is appended to the logout message 156 and sent via transmission system 60 to the remote computer 40. The information sent in logout message 156 is utilized by the remote computer 40 to update the Cy Borg's user information stored in user record 52a. For this example, Cy Borg's phone directory and appointments will be updated.

Figure 5:
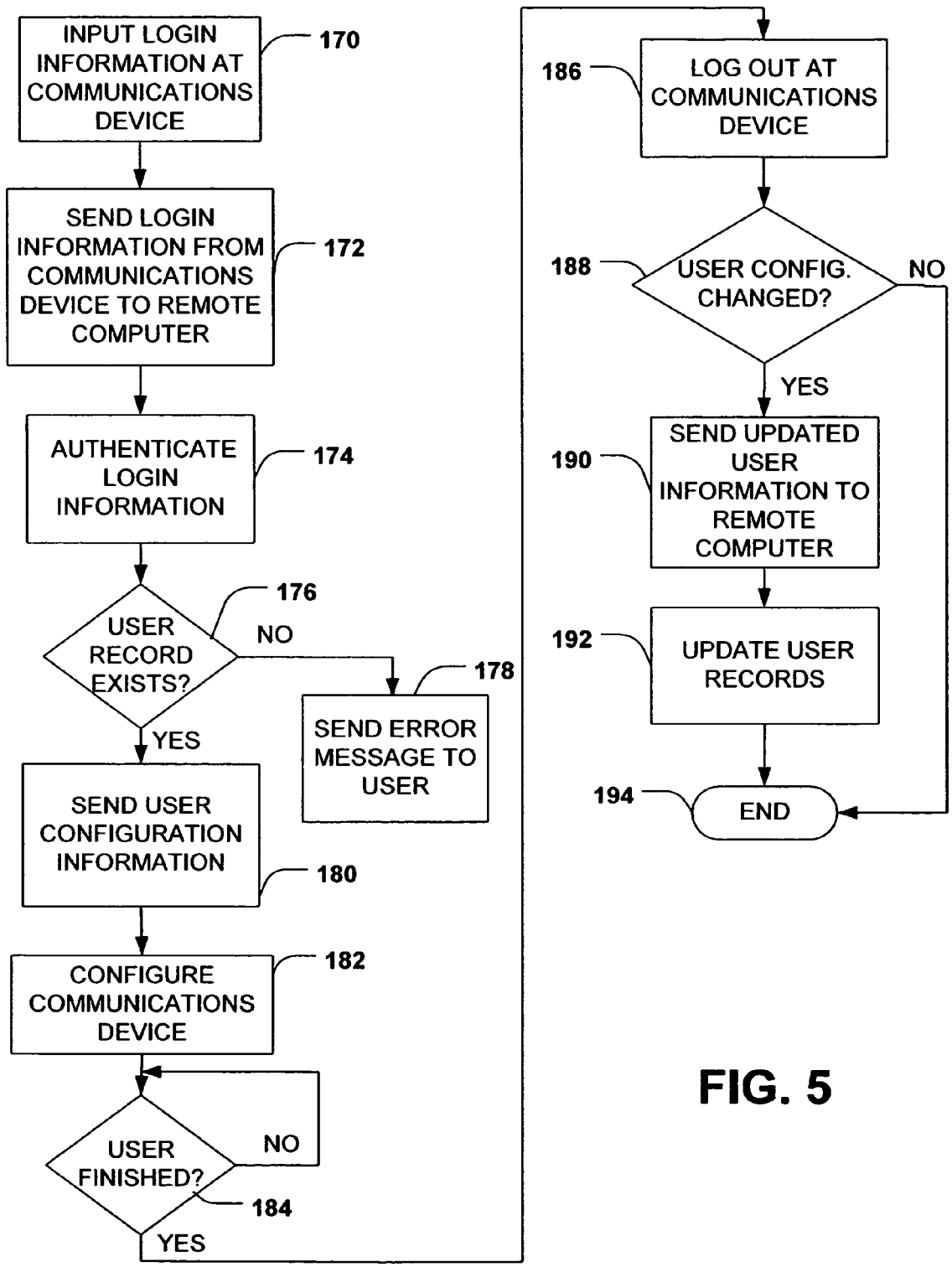
FIG. 5 is a flow chart diagram illustrating a methodology for enabling user configuration services in accordance with an aspect of the present invention.

FIG. 5 illustrates a methodology providing user services and configuration in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 5, a flow chart diagram illustrates a methodology for providing user services and configuration in accordance with an aspect of the present invention. At 170, login information is input into a communications device. At 172, the login information is transmitted from the communications device to a remote computer. At 174, the remote computer authenticates the user login information by querying/searching a database for a matching user record. At 176, if no matching user record is located, the process proceeds to 178 and transmits an error message from the remote computer to the user. If a matching user record is located at 176, the process proceeds to 180. At 180, user configuration information in the matching user record is transmitted to the communications device. At 182, the communications device is configured according to the information received in 180. At 184, the current user continues to utilize the received applications until communications device operations are complete. When the user no longer requires the services of the communications device, the process proceeds to 186. At 186, the user initiates a logout from the communications device. At 188, if no user configuration information has changed, the user is logged out and the process ends, at 194. If the user configuration information has changed at 188, the process proceeds to 190. At 190, the changed user configuration information is sent to the remote computer. At 192, the remote computer updates the user records with the changed configuration information and proceeds to 194 and ends.

Figure 6:
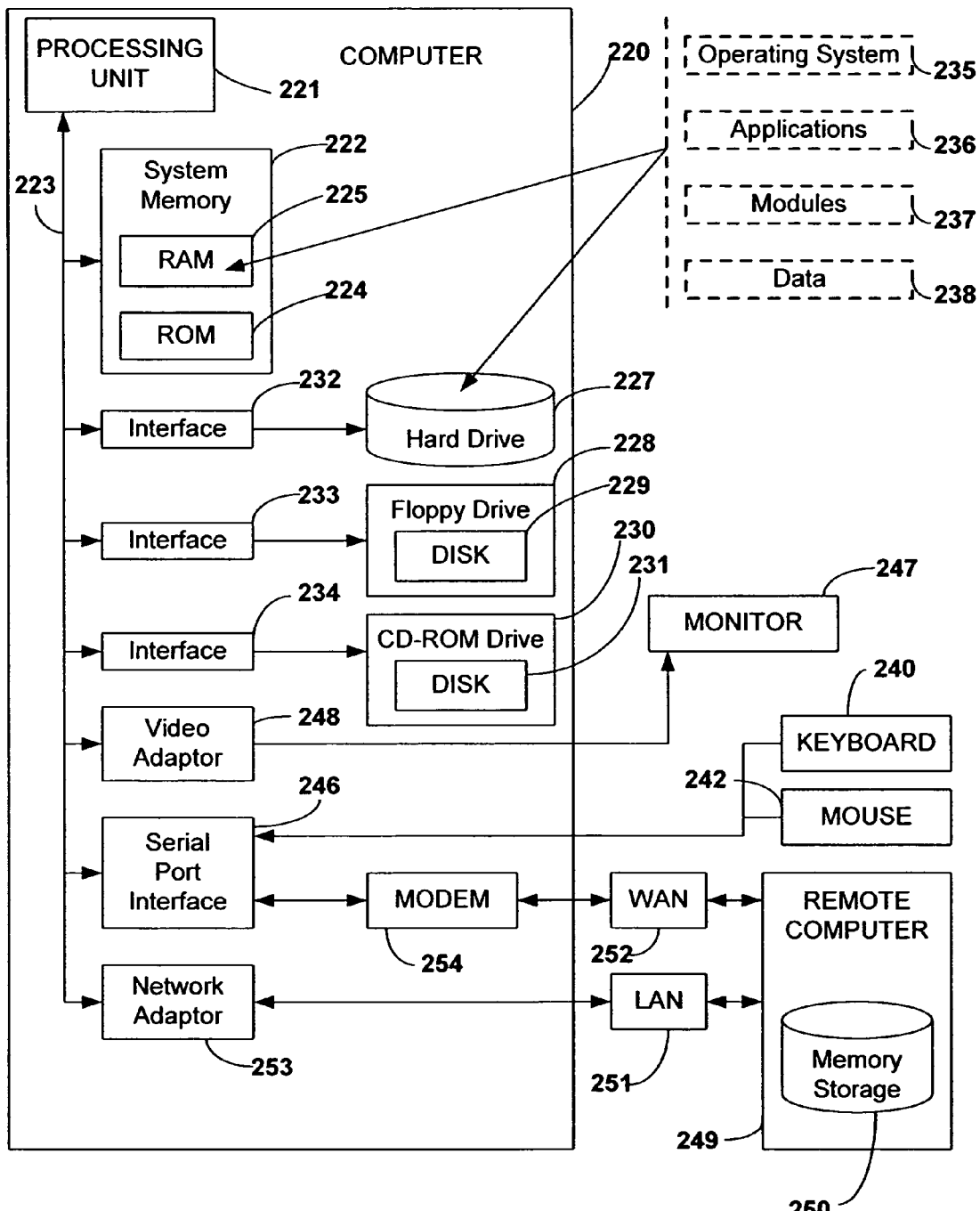
FIG. 6 is a schematic block diagram illustrating a suitable operating environment in accordance with an aspect of the present invention.

In order to provide a context for the various aspects of the invention, FIG. 6 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 6, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors. Dual microprocessors and other multi-processor architectures also can be utilized as the processing unit 221.

The system bus may be any of several types of bus structure including a memory bus or memory controller, a peripheral bus, and a local bus using any of a variety of commercially available bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be any suitable operating system such as are available commercially.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 6. The logical connections depicted in FIG. 6 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A communications system providing user configuration, comprising:
   at least one communications device configurable for a plurality of users;
   a configuration request message generated by the communications device to initiate configuration of the communications device;
   a remote computer for generating a configuration response message;
   a first configuration file for a user containing a first value for at least one configurable setting of the communications device;
   a second configuration file for the user containing a second value for the at least one configurable setting of the communications device; and
   a configuration response message received by the communications device to enable configuration of the communications device, wherein the configuration response message includes configuration information comprising at least the first value or second value for the at least one configurable setting of the communications device for the user.

2. The system of claim 1, further comprising a plurality of configuration files for the user containing values for configurable settings of a plurality of communications devices.

3. The system of claim 2, further comprising a plurality of configuration files associated with the plurality of users.

4. The system of claim 3, wherein the configuration files include at least one of authorization, application, and settings information associated with at least one user.

5. The system of claim 2, further comprising a user request service for processing a login request associated with at least one user.

6. The system of claim 2, further comprising an authentication service for verifying configurations that a user can access.

7. The system of claim 2, further comprising a record locate service for searching for configurations associated with a user.

8. The system of claim 2, further comprising a configuration message service for sending configuration information in the configuration response message.

9. The system of claim 2, further comprising an update service for updating configuration information that has changed by the user.

10. The system of claim 1, further comprising a user identification service for processing login information associated with at least one user.

11. The system of claim 10, wherein the login information includes at least one of a user name and a password.

12. The system of claim 1, further comprising a message service for transmitting login information associated with at least one user.

13. The system of claim 1, further comprising a configuration service for processing the configuration response message and updating the communications device with the configuration information.

14. The system of claim 1, further comprising a logout service for sending updated user configuration information.

15. The system of claim 1, wherein the configuration response message enables the communications device to be updated with at least one application and associated setting.

16. The system of claim 1, wherein the configuration response message enables the communications device to be updated with a plurality of applications and associated settings.

17. The system of claim 1, wherein the communications device further comprises at least one of a Personal Digital Assistant (PDA), palm pilot, cell phone, pager, and laptop computer.

18. A method providing a configurable communications device, comprising:
    storing a first configuration file for a user containing a first value for at least one configurable setting of a communications device, and a second configuration file for the user containing a second value for the at least one configurable setting of the communications device;
    generating a configuration request message;
    generating a configuration response message including configuration information comprising at least the first value or second value for the at least one configurable setting of the communications device for the user based upon the configuration request message; and
    configuring the communications device with the configuration information in the configuration response message.

19. The method of claim 18, further comprising,
    sending an update message from the communications device to indicate user changes in the configuration information.

20. The method of claim 19, further comprising,
    updating records associated with the user changes in the configuration information.

21. The method of claim 18, further comprising,
    transmitting login information associated with a user.

22. The method of claim 21, wherein the login information includes at least one of a user name and a password.

23. The method of claim 22, further comprising,
    authenticating the login information.

24. The method of claim 23, further comprising,
    generating an error message if the authentication fails.

25. The method of claim 18, further comprising,
    generating a logout message to transmit updated user configuration information.

26. A system providing a configurable communications device, comprising:
    means for storing a first configuration file for a user containing a first value for at least one configurable setting of a communications device, and a second configuration file for the user containing a second value for the at least one configurable setting of the communications device;
    means for generating a configuration request message;
    means for generating a configuration response message including configuration information comprising at least the first value or second value for the at least one configurable setting of the communications device for the user based upon the configuration request message; and
    means for configuring the communications device with the configuration information.

27. The system of claim 26, further comprising,
    means for sending an update message from the communications device to indicate user changes in the configuration information.

28. The system of claim 27, further comprising,
    means for updating records associated with the user changes in the configuration information.

29. A communications system providing user configuration, comprising:
    at least one remote computer for storing configurations associated with a plurality of users;
    a first stored configuration for a user containing a first value for at least one configurable setting of a communications device;
    a second stored configuration for the user containing a second value for the at least one configurable setting of the communications device;
    a configuration request message processed by the remote computer to determine configurations associated with a combination of at least one communications device and with the plurality of users; and
    a configuration response message generated by the remote computer, wherein the configuration response message includes configuration information comprising at least the first value or second value for the at least one configurable setting of the communications device for the user.

30. The system of claim 29, further comprising the communications device receiving the configuration response message and utilizing the configuration information to configure the communications device.

31. A communications system providing user configuration, comprising:
    at least one communications device configurable for a plurality of users;
    at least one remote computer for storing configuration information associated with the plurality of users, a first stored configuration for a user containing a first value for at least one configurable setting of the communications device, a second stored configuration for the user containing a second value for the at least one configurable setting of the communications device;

a configuration request message generated by the communications device to initiate a configuration of the communications device; and a configuration response message generated by the remote computer to enable configuration of the communications device, wherein the configuration response message includes configuration information comprising at least the first value or second value for the at least one configurable setting of the communications device.

* * * * *